(12) United States Patent
Shenaq et al.

(10) Patent No.: US 11,077,811 B2
(45) Date of Patent: Aug. 3, 2021

(54) GRILLE REINFORCEMENT

(71) Applicant: Ford Global Technologies, LLC, Dearborn, MI (US)

(72) Inventors: Mohammed Shenaq, Dearborn, MI (US); Sudip Sankar Bhattacharjee, Novi, MI (US); Mustafa Ahmed, Canton, MI (US); Neil Clarke, Ann Arbor, MI (US); Richard Lisowski, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 181 days.

(21) Appl. No.: 16/241,433

(22) Filed: Jan. 7, 2019

(65) Prior Publication Data
US 2019/0359155 A1 Nov. 28, 2019

Related U.S. Application Data

(60) Provisional application No. 62/676,623, filed on May 25, 2018.

(51) Int. Cl.
  *B60R 19/12* (2006.01)
  *B60R 19/52* (2006.01)
  *B60R 21/34* (2011.01)

(52) U.S. Cl.
  CPC .............. *B60R 19/12* (2013.01); *B60R 19/52* (2013.01); *B60R 21/34* (2013.01); *B60R 2019/527* (2013.01)

(58) Field of Classification Search
  CPC ......... B60R 19/52; B60R 21/34; B60R 19/12; B60R 19/40; B60R 19/54; B60R 2019/525; B60R 2021/343
  USPC .. 293/146, 102, 144, 154, 155, 9, 50, 5, 48, 293/4; 296/187.09, 187.04, 187.03, 57.1, 296/55, 38, 208
  See application file for complete search history.

(56) References Cited

U.S. PATENT DOCUMENTS

| 6,224,120 | B1 | 5/2001 | Eipper et al. |
| 8,905,463 | B2 * | 12/2014 | Kuhne ................... B60R 19/18 296/187.09 |
| 9,254,801 | B2 | 2/2016 | Sogabe et al. |
| 9,315,168 | B2 | 4/2016 | Pugh-Jones et al. |
| 9,586,624 | B2 * | 3/2017 | Riedl ................... B62D 25/085 |
| 9,884,600 | B2 * | 2/2018 | Fujimoto ............... B62D 25/08 |
| 10,093,173 | B1 * | 10/2018 | Frayer ................. B60K 11/085 |

(Continued)

FOREIGN PATENT DOCUMENTS

| JP | 2004345424 A | 12/2004 |
| JP | 6187484 B2 | 8/2017 |
| WO | 2012169293 A1 | 12/2012 |

*Primary Examiner* — D Glenn Dayoan
*Assistant Examiner* — Sunsurraye Westbrook
(74) *Attorney, Agent, or Firm* — Frank A. MacKenzie; Bejin Bieneman PLC

(57) ABSTRACT

A front-end structure includes a front-end support and a grille fixed relative to the front-end support. Two brackets are disposed between the front-end support and the grille. The two brackets are spaced from each other along a cross-vehicle axis. Each of the two brackets has two legs. Each of the legs extends from the front-end support toward the grille. Two bars are spaced from each other and are spaced from the front-end support. The bars are elongated along the cross-vehicle axis from one of the brackets to the other of the brackets.

20 Claims, 15 Drawing Sheets

(56) References Cited

U.S. PATENT DOCUMENTS

| | | | |
|---|---|---|---|
| 2011/0115241 A1* | 5/2011 | Gonin | B60R 19/12 |
| | | | 293/120 |
| 2012/0060776 A1* | 3/2012 | Charnesky | B60K 11/085 |
| | | | 123/41.05 |
| 2014/0132033 A1* | 5/2014 | Townson | B60K 11/085 |
| | | | 296/193.1 |
| 2017/0129448 A1* | 5/2017 | Farooq | B60R 19/023 |

* cited by examiner

GRILLE REINFORCEMENT

CROSS-REFERENCE TO RELATED APPLICATIONS

The subject patent application claims priority to and all the benefits of U.S. Provisional Patent Application No. 62/676,623 filed on May 25, 2018, which is herein incorporated by reference in its entirety.

BACKGROUND

The Global Technology Regulation (GTR) and the New Car Assessment Program (NCAP) specify leg-injury criteria for pedestrian protection. The regulations are aimed at reducing the impact force to the legs of a pedestrian by a vehicle bumper during a vehicle-pedestrian impact.

Some vehicles, such as light duty trucks and sport utility vehicles (SUVs), for example, may have a relatively high bumper height for a particular purpose such as occasional off-road use, towing, and the ability to traverse certain obstacles or terrain. As such, there is an opportunity to design a vehicle front-end for pedestrian leg impact energy management while addressing ground clearance requirements.

DETAILED DESCRIPTION

Figure 1:
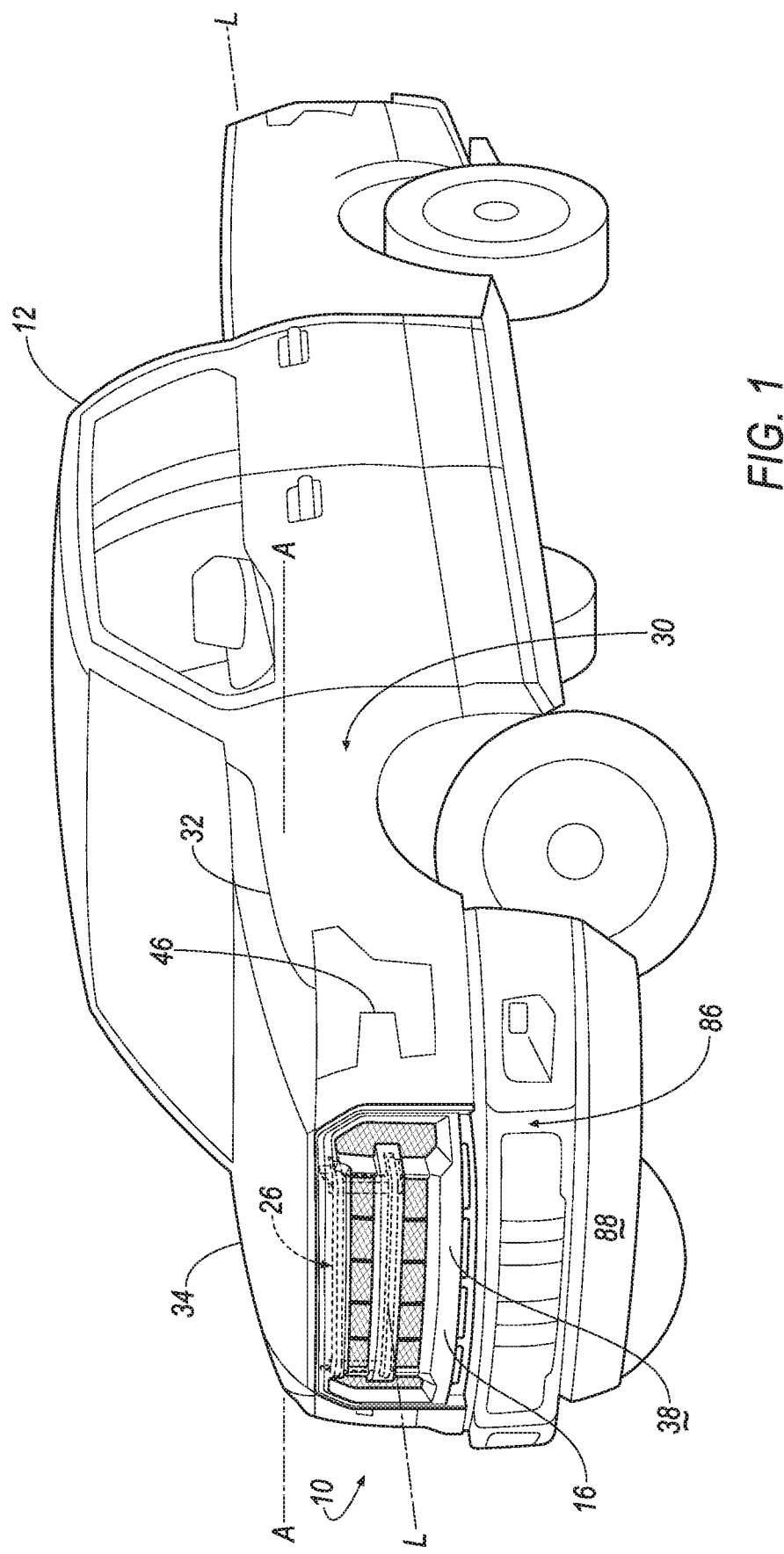
FIG. 1 is a perspective view of a vehicle including front-end structure having a bumper and a grille above the bumper.

A front-end structure includes a front-end support, a grille fixed relative to the front-end support, two brackets, and two bars. The two brackets are disposed between the front-end support and the grille and spaced from each other along a cross-vehicle axis. The two brackets each have two legs extending from the front-end support toward the grille. The two bars are spaced from each other and the front-end support. The bars are elongated along the cross-vehicle axis from one bracket to the other bracket.

The front-end structure may include a vehicle frame supporting the front-end support.

The grille may be supported by the front-end support.

The bars may be spaced from the front-end support in a vehicle-longitudinal axis perpendicular to the cross-vehicle axis. The front-end structure may include a bumper below the bars and substantially aligned with the bars along the vehicle-longitudinal axis.

The front-end structure may include a vehicle frame, and the bumper is attached to the vehicle frame.

The front-end structure may include a radiator, the front-end support being between the radiator and the grille.

The front-end structure may include an active grille shutter between the radiator and the grille.

Both legs of both brackets may be attached to the front-end support.

Both of the bars may be attached to both of the brackets.

The grille may include cavities receiving the bars.

The grille may be overmolded to the bars.

The front-end structure may include a grille reinforcement including the two bars and a support overmolded to the bars.

The bars may have an open shape in cross section normal to the cross-vehicle axis.

The support may include ribs disposed in the opening of the bars. The ribs may be spaced along the cross-vehicle axis.

The front-end structure may include an active grille shutter between a radiator and the grille. The grille reinforcement and the brackets may be overmolded with the active grille shutter.

Both bars and both brackets may be rigid relative to a leg form during a pedestrian protection impact test.

The two bars may be parallel to each other.

The front-end structure may include a vehicle frame and a vehicle body. The vehicle body may include two rails each including an upper portion elongated along a vehicle-longitudinal axis and each including a lower portion extending from the upper portion to the vehicle frame. The front-end support may be attached to the lower portions.

The front-end support may include a lower portion abutting the lower portions of the two rails and may include arms abutting the upper portions and elongated along the vehicle-longitudinal axis.

The lower portion of the front-end support may be attached to the vehicle frame.

With reference to the Figures, wherein like numerals indicate like parts throughout the several views, a front-end structure 10 of a vehicle 12 includes a front-end support 14. A grille 16 is fixed relative to the front-end support 14. Two brackets 18 are disposed between the front-end support 14 and the grille 16. The two brackets 18 are spaced from each other along a cross-vehicle axis A. Each of the brackets 18 has two legs 22. Each of the legs 22 extend from the front-end support 14 toward the grille 16. Two bars 24 are spaced from each other and are spaced from the front-end support 14. The two bars 24 are elongated along the cross-vehicle axis A from one bracket 18 to the other bracket 18.

Figure 3:
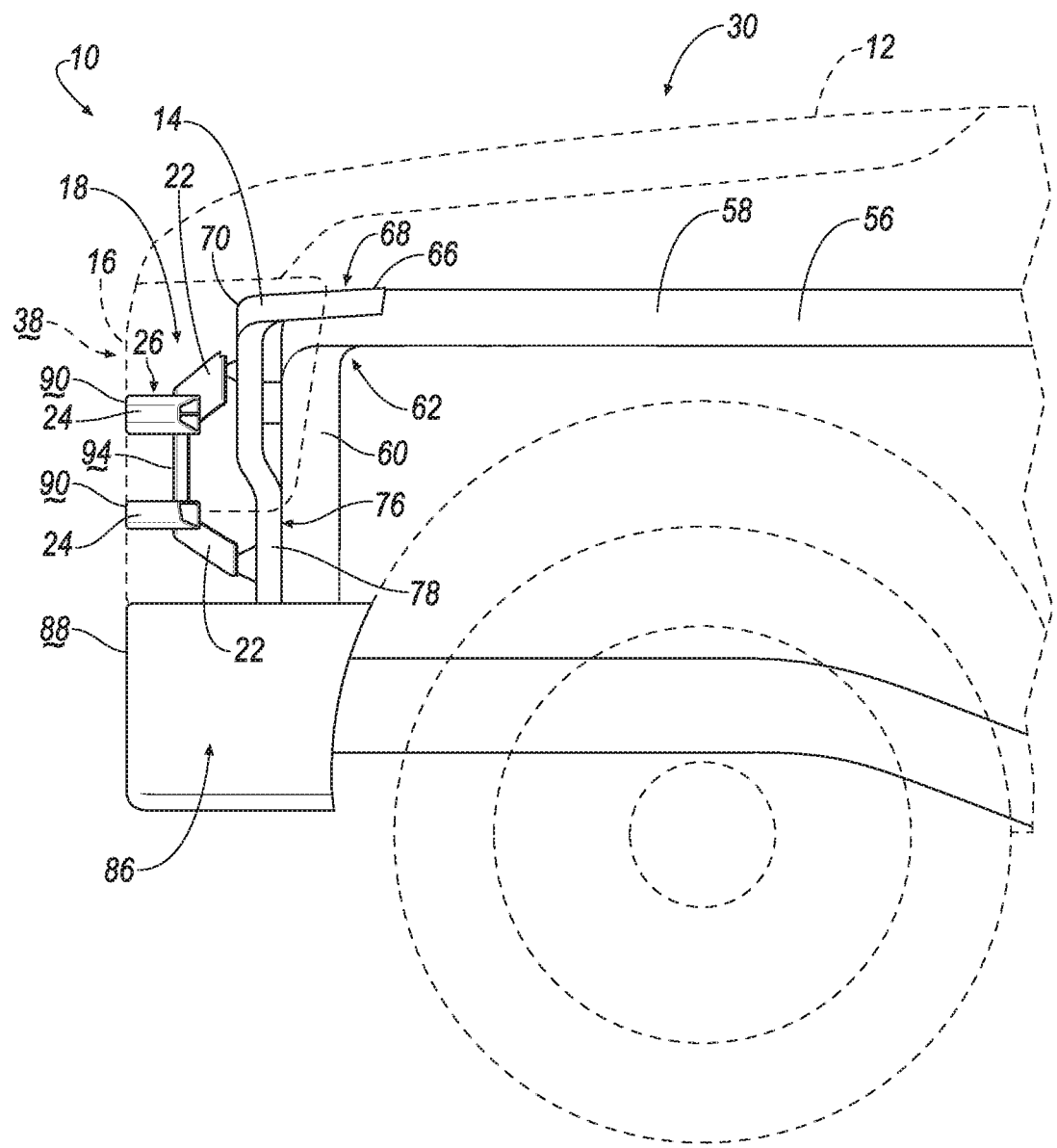
FIG. 3 is a side view of the front-end structure with the grille and body shown in broken lines.
Figure 4:
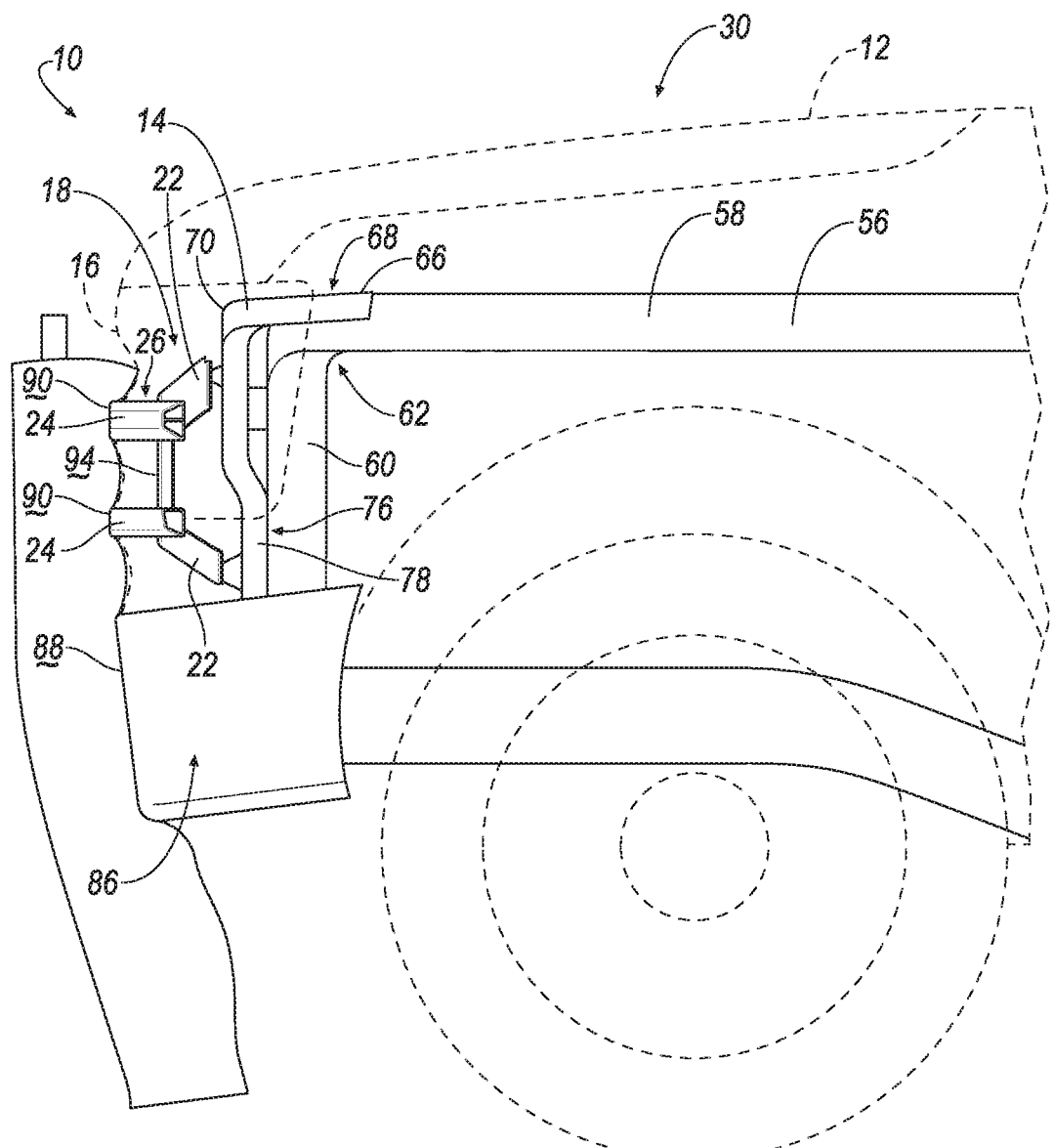
FIG. 4 is a side view of a front-end structure of FIG. 3 impacting a leg form during a pedestrian-impact test.

With reference to FIGS. 3 and 4, during a pedestrian impact test of the vehicle 12, the grille 16 contacts a pedestrian leg form, specifically the femur. The bars 24 reinforce the grille 16 to reduce buckling of the leg form of the pedestrian about the knee. In other words, the bars are positioned to distribute loading of force across the leg form and reduce relative movement between the femur and the tibia. The spacing of the bars 24 from each other increases the distribution of the load across the leg form. The two legs 22 of each bracket 18 distributes force transmission from the bars 24 to the front-end support 14 and increases the stability of the brackets 18.

Figure 2:
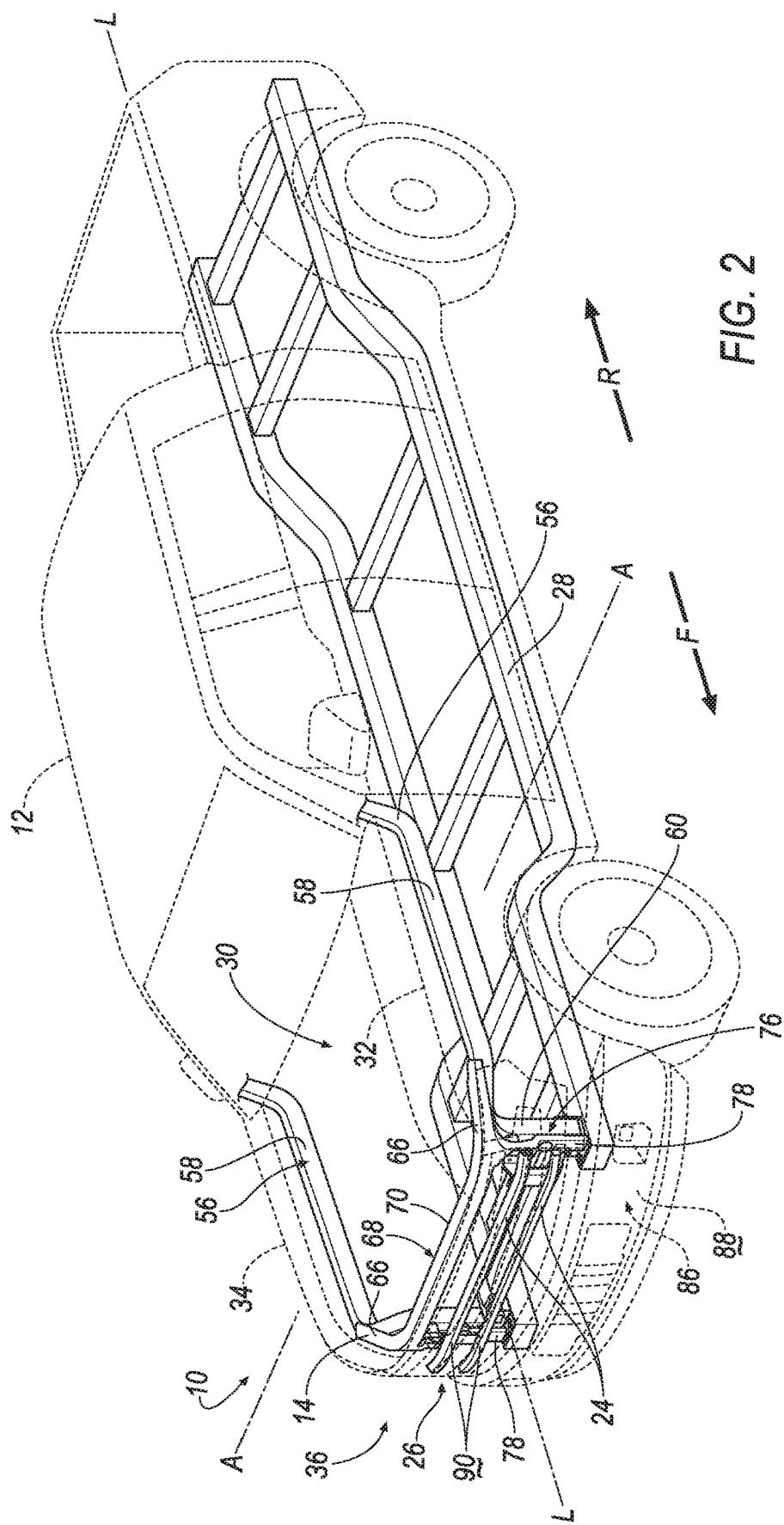
FIG. 2 is a perspective view of a vehicle with the bumper, grille, and body shown in broken lines to show a front-end support supported on a vehicle frame and a grille reinforcement supported on the front-end support.

With reference to FIGS. 1 and 2, the vehicle 12 is elongated along a vehicle-longitudinal axis L. The front-end structure 10 includes a left side 32 and a right side 34 spaced from each other along the cross-vehicle axis A perpendicular to the vehicle-longitudinal axis L. Common numerals are used to identify common features of the left side 32 and the right side 34. The left side 32 and the right side 34 may be mirror images of each other about the vehicle-longitudinal axis L, or at least may include several features that are mirror images about the vehicle-longitudinal axis L.

With reference to FIGS. 1-3, the front-end structure 10 may include a vehicle frame 28 and a vehicle body 30. The vehicle body 30 is supported on the vehicle frame 28. As shown in the Figures, the vehicle body 30 and the vehicle frame 28 may have a body-on-frame construction (also referred to as a cab-on-frame construction). In other words, the vehicle body 30 and the vehicle frame 28 are separate components, i.e., are modular, and the vehicle body 30 is supported on and attached to the vehicle frame 28. The vehicle body 30 may be attached to the vehicle frame 28 in any suitable way including welding, bolting, etc. As another example, the vehicle body 30 and the vehicle frame 28 may be of a unibody construction. In the unibody construction, the vehicle body 30, e.g., rockers, serves as the vehicle frame 28, and the vehicle body 30 (including the rockers, pillars, etc.) is unitary, i.e., a continuous one-piece unit. The vehicle body 30 and the vehicle frame 28 may be of any suitable material, for example, steel, aluminum, etc.

Figure 7:
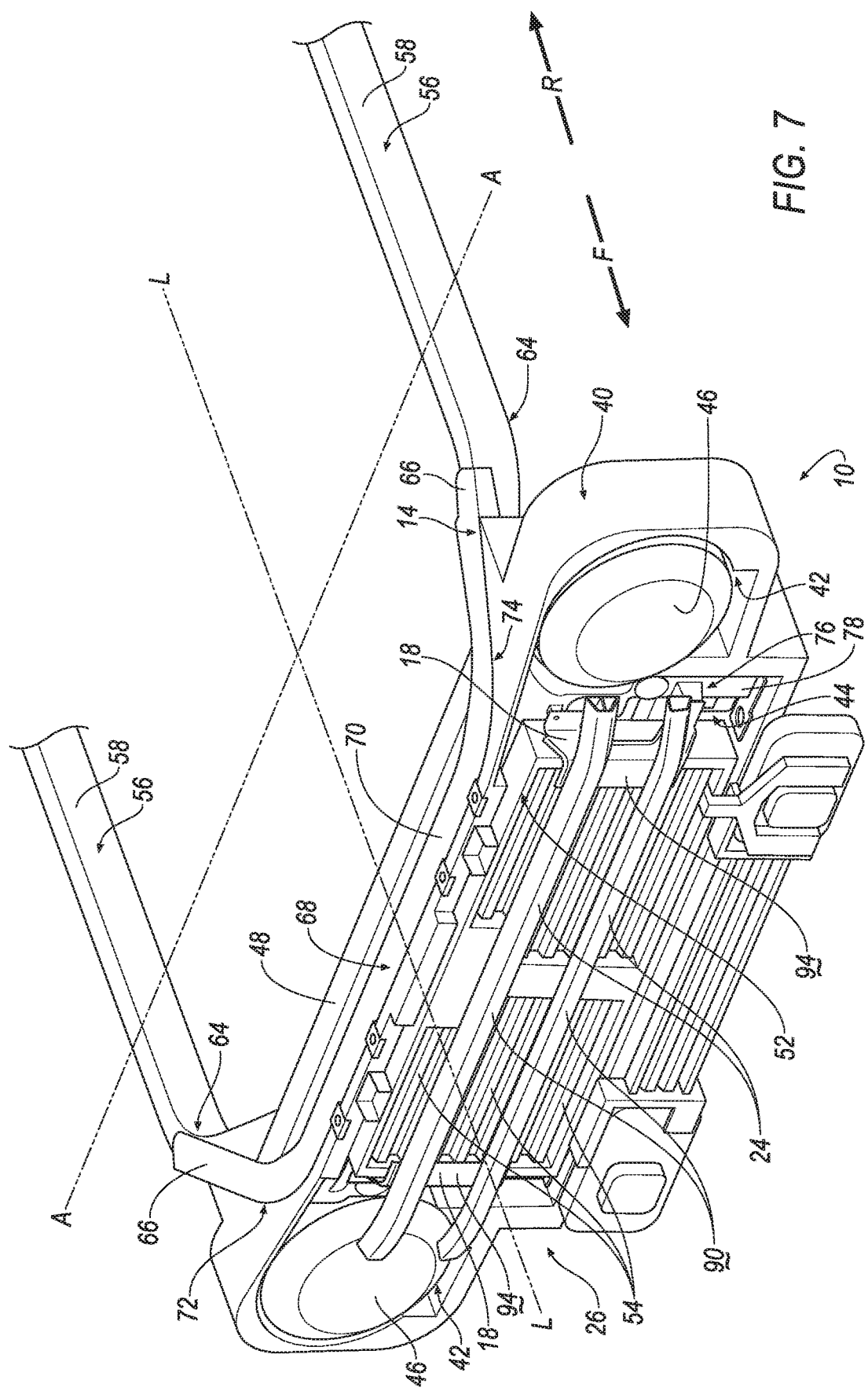
FIG. 7 is a perspective view of a portion of one embodiment the front-end structure.
Figure 8:
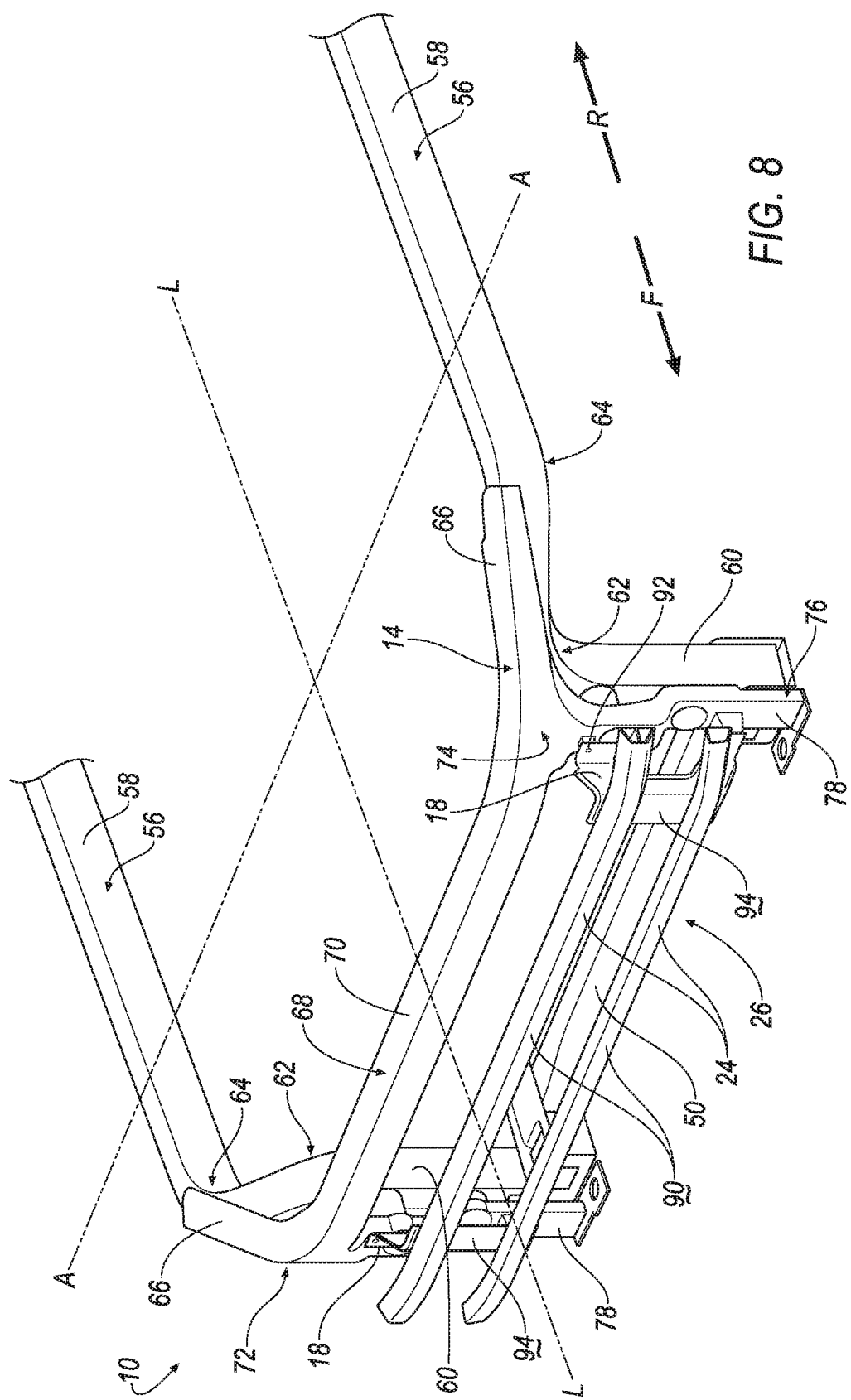
FIG. 8 is a perspective view of a portion of the front-end structure.

With reference to FIGS. 2, 7, and 8, the vehicle body 30 may include the two rails 56. The rails 56 may support fenders (not shown) of the vehicle 12. The rails 56 may be referred to as fender support rails and/or shotgun rails. The rails 56 are spaced from each other along the cross-vehicle axis A. In other words, one rail 56 may be on the left side 32 of the front-end structure 10 and the other rail 56 may be on the right side 34 of the front-end structure 10. The rails 56 may extend to the A-pillar of the vehicle body 30.

With reference to FIG. 8, each of the rails 56 may include an upper portion 58 and a lower portion 60. The upper portion 58 of each rail 56 may be elongated along the vehicle-longitudinal axis L. The lower portion 60 of each rail 56 may extend downwardly from the upper portion 58 of each respective rail 56 to the vehicle frame 28, as shown in FIG. 2. The lower portion 60 of each rail 56 may be fixed to the upper portion 58 and to the vehicle frame 28. The lower portion 60 of each rail 56 may be unitary with the upper portion 58 of each respective rail 56, i.e. the upper portion 58 and the lower portion 60 of each rail 56 may be formed together as a single unit. As another example, the upper portion 58 and the lower portion 60 may be separately formed and subsequently assembled together. As an example, and as shown in FIG. 8, each rail 56 may have a first bend 62 connecting the upper portion 58 of each rail 56 to the lower portion 60 of each respective rail 56.

With reference to FIG. 2, the rails 56 are supported by the vehicle frame 28. As mentioned above, the lower portion 60 of each rail 56 may be attached to the vehicle frame 28. As one example, the lower portion 60 of each rail 56 may be fixed directly to the vehicle frame 28 with no intermediate component. The lower portion 60 of each rail 56 may be fixed directly to the vehicle frame 28 in any suitable way including fasteners, welding, etc.

With reference to FIG. 8, the upper portion 58 of each rail 56 may have a second bend 64. The upper portion 58 of each rail 56 may extend inward from the second bend 64 of each respective rail 56 toward the vehicle-longitudinal axis L and the first bend 62 of each respective rail 56. The first bend 62 and the second bend 64 of each rail 56 may be curved as shown in FIG. 8. As another example, the first bend 62 and the second bend 64 of each rail 56 may be angular. Each of the rails 56 may be supported by the vehicle frame 28. The rails 56 may be steel, aluminum, composite material, or any suitable material.

With reference to FIG. 7, the front-end structure 10 may include a housing 40. The housing 40 is also known as a grille opening reinforcement (GOR). The housing 40 may be elongated along the cross-vehicle axis A. As an example, and as shown in FIG. 7, the housing 40 may include a first cavity 42 for receiving a headlight 46. The housing 40 may be disposed between the bars 24 and the front-end support 14. In other words, the housing 40 is in a vehicle-forward direction F of the front-end support 14 and is in a vehicle-rearward direction R of the bars 24. The housing 40 may be of any suitable material, e.g., plastic, metal, etc.

With reference to FIG. 7, the front-end structure 10 may include a radiator 48. The radiator 48 may be elongated along the cross-vehicle axis A, i.e., the radiator 48 is elongated from the left side 32 to the right side 34. With reference to FIG. 7, the front-end support 14 may be between the radiator 48 and the bars 24. In other words, the front-end support 14 and the bars 24 are in in a vehicle-forward direction F of the radiator 48.

Figure 10:
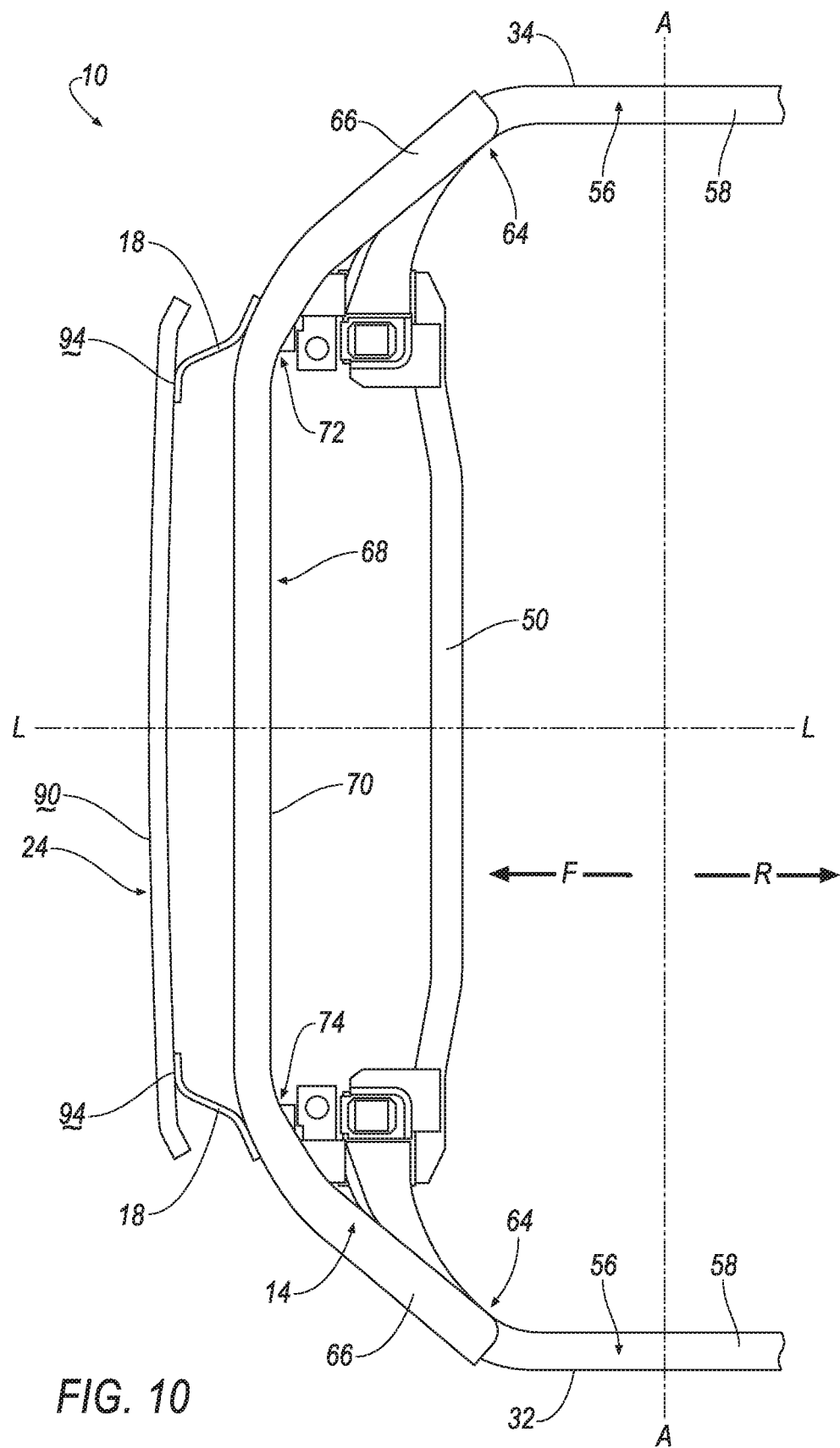
FIG. 10 is a top view of a portion of the front end.

The front-end structure 10 may include a radiator support 50, as shown in FIG. 10. The radiator support 50 may be elongated along the cross-vehicle axis A. The radiator support 50 is supported by the vehicle frame 28. The radiator support 50 supports the radiator 48. The radiator 48 may be disposed between the radiator support 50 and the front-end support 14. In other words, the radiator support 50 is in the vehicle-rearward direction R of the radiator 48.

With reference to FIG. 7, the front-end structure 10 may include an active grille shutter 52. The active grille shutter 52 may be between the radiator 48 and the bars 24. As an example, the active grille shutter 52 may be in front of the radiator 48 and behind the bars 24, i.e., in the vehicle-forward direction F of the radiator 48 and in the vehicle-rearward direction R of the bars 24. The active grille shutter 52 may be disposed in a second cavity 44 of the housing 40. The active grille shutter 52 may be elongated along the cross-vehicle axis A. The active grille shutter 52 may include a plurality of vents 54 configured to open and close, for example, to control airflow to the radiator 48 and/or to control vehicle aerodynamics.

With reference to FIGS. 1-4, the front-end structure 10 may include a bumper 86. The bumper 86 is elongated along the cross-vehicle axis A. The bumper 86 may have a vehicle-forward face 88. The vehicle-forward face 88 may be a class-A surface, i.e., a surface specifically manufactured to have a high-quality, finished aesthetic appearance free of blemishes.

The bumper 86 may be attached to the vehicle frame 28. As an example, the bumper 86 may be fixed directly to the vehicle frame 28 and by any suitable way including fasteners, welding, etc.

With reference to FIG. 3, the bumper 86 is be below the bars 24. The bumper 86 may be substantially aligned with the bars 24 along the vehicle-longitudinal axis L. Specifically, and as shown in FIG. 2, the bars 24 have a vehicle-forward face 90, and the vehicle-forward face 90 of the bars 24 and the vehicle-forward face 88 of the bumper 86 may be aligned along the vehicle-longitudinal axis L. As an example, the vehicle-forward face 88 of the bumper 86 and the vehicle-forward faces 90 of the bars 24 may be aligned along the vehicle-longitudinal axis L within +/−15 millimeters. Accordingly, the vehicle-forward face 88 of the bumper 86 and the vehicle-forward faces 90 of the bars 24 may simultaneously engage a leg form, as shown in FIG. 4, to distribute loading of force across the leg form and reduce relative movement between the femur and the tibia.

The front-end support 14 may support a plurality of vehicle components, e.g., the grill 16, the housing 40, etc., as set forth further below. The front-end support 14 may be of any suitable material, e.g. steel, aluminum, plastic, etc. The front-end support 14 may be any suitable component of the front-end structure 10. For example, the front-end support 14 may be the rails 56, e.g., the lower portion 60 of the rails 56. As another example, the front-end support 14 may be a cross-vehicle beam extending from one rail 56 to the other rail 56. As yet another example, the front-end support 14 may be a bolster, as shown in the Figures. In this situation, the front-end support 14 is elongated along the cross-vehicle axis A from the left side 32 of the front-end structure 10 to the right side 34 of the front-end structure 10, as shown in FIGS. 7 and 8. The front-end support 14 is in the vehicle-forward direction F of the rails 56. As an example, and as shown in FIG. 7, the front-end support 14 may be between the radiator 48 and the bars 24 along the vehicle-longitudinal axis L.

With continued reference to FIGS. 7 and 8, the front-end support 14 may include arms 66. As an example, the front-end support 14 includes an upper portion 68, and the upper portion 68 of the front-end support 14 may include the two arms 66. The upper portion 68 of the front-end support 14 may have a middle portion 70 and the two arms 66 extend from the middle portion 70. The middle portion 70 may extend through a first bend 72 of the front-end support 14 to one of the two arms 66 and the middle portion 70 may extend through a second bend 74 of the front-end support 14 to the other of the two arms 66. Each of the upper portions 58 of the rails 56 may support each of the arms 66 of the front-end support 14, respectively. Each of the arms 66 may abut each of the two upper portions 58 of the rails 56, respectively. The arms 66 may be attached to the rails 56 in any suitable way including welding and bolting. Each arm 66 may be elongated along the vehicle-longitudinal axis L, i.e., each arm 66 may be elongated from the middle portion 70 to the rails 56.

With continued reference to FIGS. 7 and 8, the front-end support 14 may include a lower portion 76. The lower portion 76 may include two members 78. One of the two members 78 may extend from the first bend 72 of the upper portion 68 of the front-end support 14 toward the vehicle frame 28 and the other of the two members 78 may extend from the second bend 74 of the upper portion 68 of the front-end support 14 toward the vehicle frame 28.

With reference to FIG. 8, the lower portion 76 of the front-end support 14, e.g., the two members, may abut the lower portions 60 of the two rails 56. The two members 78 may be in the vehicle-forward direction F of the lower portions 60 of the rails 56.

The front-end support 14, e.g., the lower portion 76 of the front-end support 14, may be attached to the lower portions 60 of the two rails 56. As an example, the members 78 of the front-end support 14 may be fixed directly to the lower portions 60 of the two rails 56. The front-end support 14 may be attached to the lower portions 60 of the two rails 56 in any suitable way including fasteners (e.g., bolts), welding, etc.

The front-end support 14 may be supported by the vehicle frame 28. As an example, the lower portion 76 of the front-end support 14 may be attached to the vehicle frame 28. As an example, the front-end support 14 may be fixed directly to the vehicle frame 28, e.g., in any suitable way including fasteners (e.g., bolts), welding, etc.

With reference to FIGS. 2-4, the vehicle body 30 may support the front-end support 14. As an example, and as previously mentioned, the front-end support 14 may be supported by and fixed directly to the rails 56, as shown in FIG. 8. As another example and as shown in FIG. 7, the front-end support 14 may be supported and fixed directly to the housing 40 in any suitable way including fastening, welding, etc.

With reference to FIGS. 3 and 4, the grille 16 may be supported by the front-end support 14. The grille 16 may be fixed relative to the front-end support 14. In other words, the grille 16 and the front-end support 14 move together as a unit. As an example, and as shown in FIG. 7 the grille 16 may be fixed indirectly to the front-end support 14 through an intermediate component such as the housing 40. As an example, the grille 16 may be attached to the housing 40 by any suitable way including fasteners, welding, etc.

Figure 5:
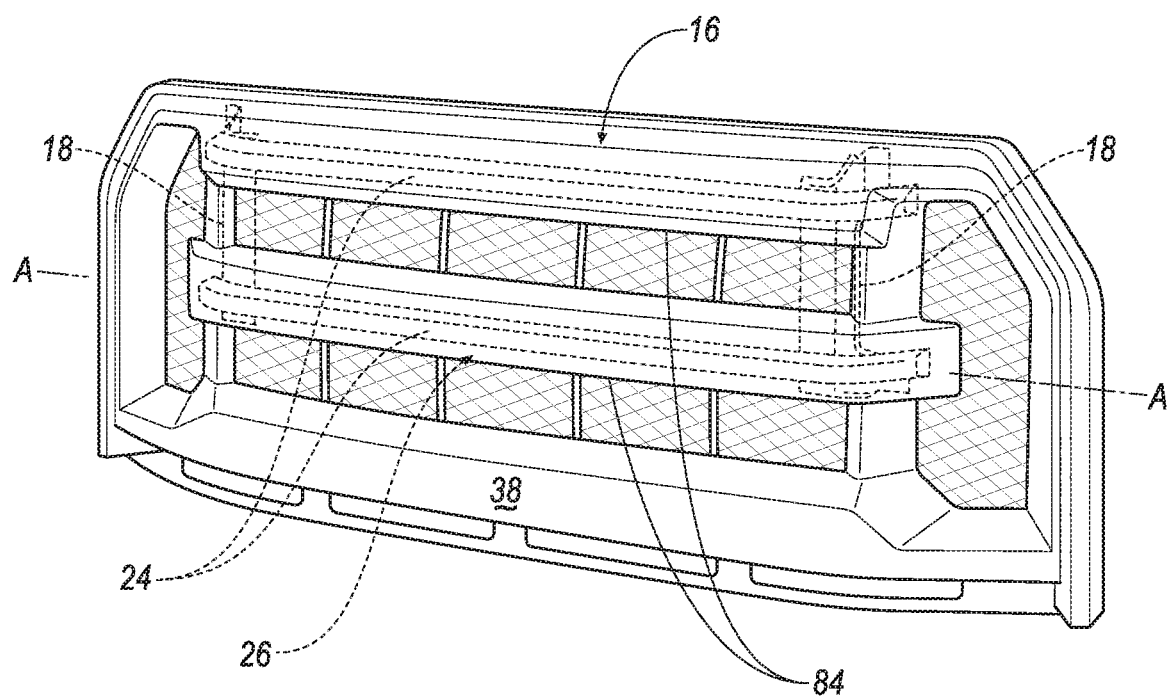
FIG. 5 is a perspective view of the grille and the grille reinforcement.

With reference to FIG. 1, the grille 16 may be elongated along the cross-vehicle axis A. In other words, the grille 16 may be elongated from the left side 32 to the right side 34. As an example, the grille 16 may elongated from one of the two rails 56 to the other of the two rails 56. The grille 16 may be in the vehicle-forward direction F of the front-end support 14. The grille 16 may include a vehicle-forward face 38, as shown in FIG. 5. The vehicle-forward face 38 faces the vehicle-forward direction F. The vehicle-forward face 38 may be a class-A surface, i.e., a surface specifically manufactured to have a high-quality, finished aesthetic appearance free of blemishes. The grille 16 may be of any suitable material, including plastic, such as injection-molded plastic; metal, such as aluminum or steel; or any other suitable material.

The vehicle-forward face 38 of the grille 16 may cover the bars 24 in the vehicle-forward direction, as shown in the Figures. In other words, in such an example, the bars 24 are not visible from an exterior of the vehicle 12. As another example, the bars 24 may extend through the grille 16 such that the vehicle-forward faces 90 of the bars 24 are visible from an exterior of the vehicle 12. In such an example, both the vehicle-forward face 38 of the grille 16 and the vehicle-forward faces 90 may each be a class-A surface, i.e., a surface specifically manufactured to have a high-quality, finished aesthetic appearance free of blemishes. In the example where the bars 24 extend through the grille 16, the vehicle-forward faces 90 of the bars 24 may be flush with the vehicle-forward face 38 of the grille 16, or the vehicle-forward faces 90 of the bars 24 may be in the vehicle-forward direction of the vehicle-forward face 38 of the grille 16.

With reference to FIGS. 1-4, the front-end structure 10 includes a grille reinforcement 26. The grille reinforcement 26 may be elongated along the cross-vehicle axis A. The grille 16 may extend over, i.e., may cover, the grille reinforcement 26. The grille reinforcement 26 reinforces the grille 16 to distribute the load across a leg form during a pedestrian impact test, as shown in FIG. 4, and as described further below. Specifically, the grille reinforcement 26 and bumper 86 are positioned relative to each other to distribute loading of force across the leg form, i.e., so both the grille reinforcement 26 and the bumper 86 impact the leg form and reduce relative movement between the femur and the tibia.

Figure 9:
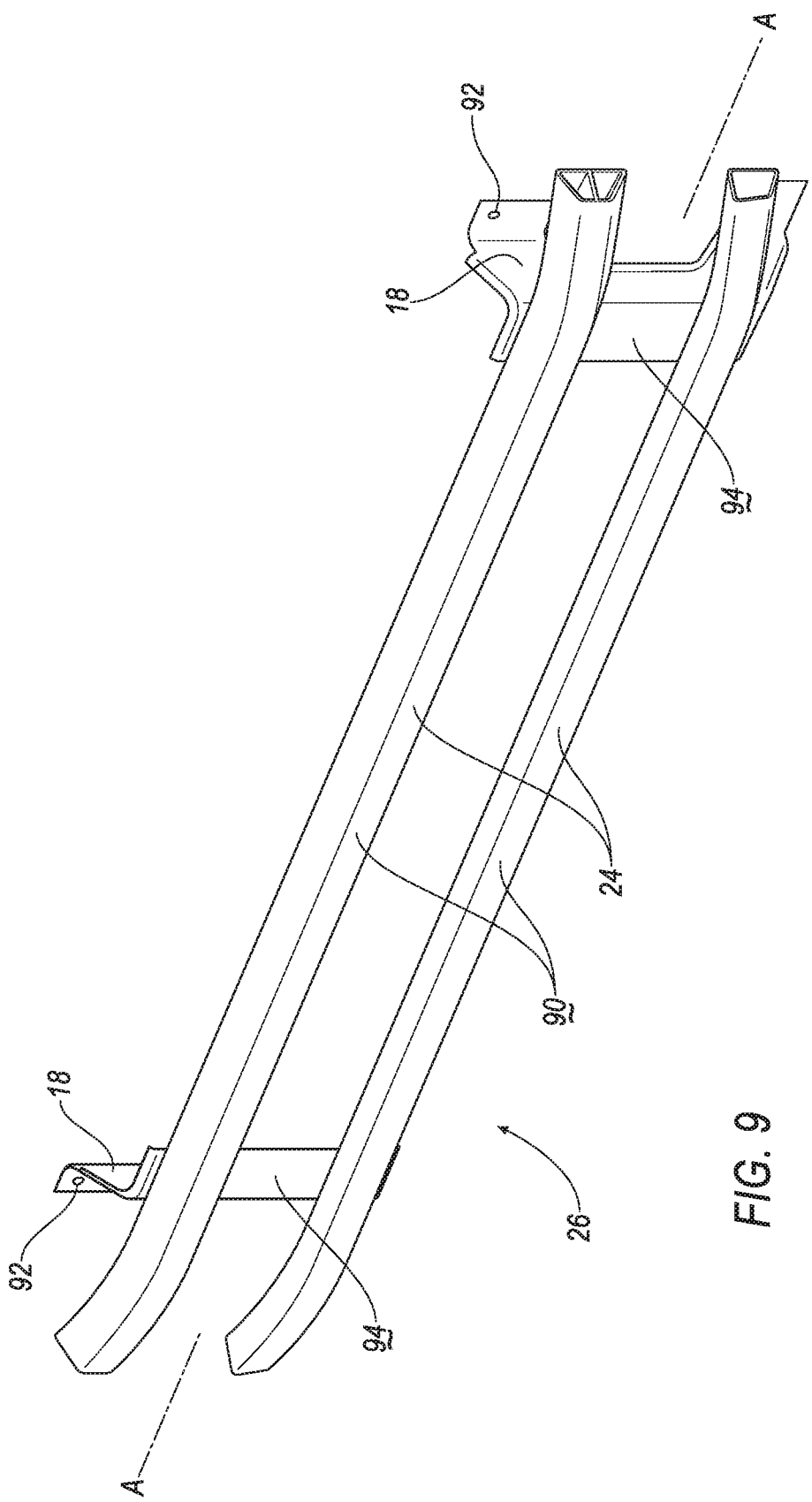
FIG. 9 is a perspective view of the embodiment of the grille reinforcement of FIG. 7.

The grille reinforcement 26 includes the two brackets 18. With reference to FIG. 3, each bracket 18 is disposed between the front-end support 14 and the grille 16. As an example, and as shown in FIG. 3, the grille 16 is in a vehicle-forward direction F of the brackets 18. As shown in FIG. 9, the two brackets 18 are spaced from each other along the cross-vehicle axis A, i.e., one of the two brackets 18 is on the left side 32 and the other of the two brackets 18 is on the right side 34.

Figure 11:
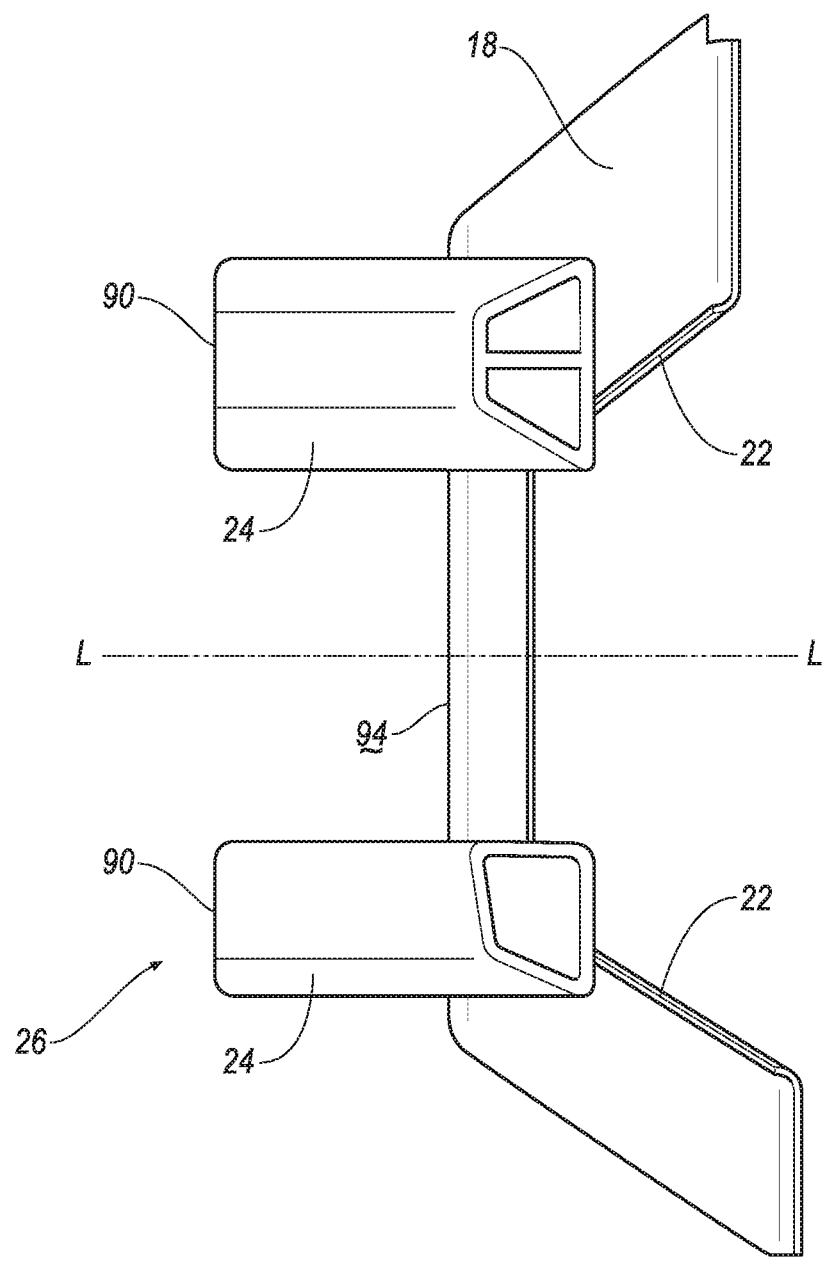
FIG. 11 is a side view of a portion of the front end.
Figure 12:
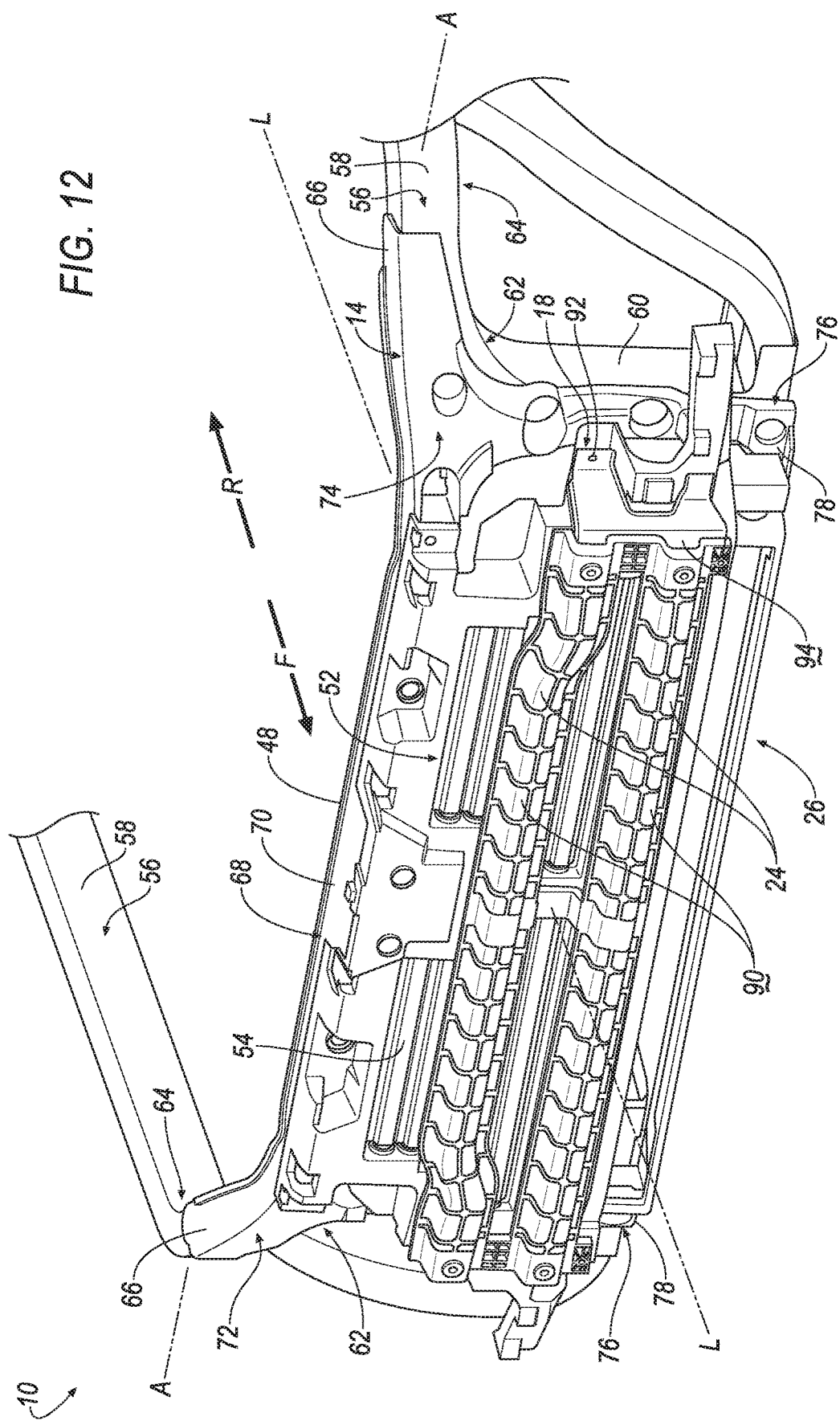
FIG. 12 is a perspective view of a portion of another embodiment the front-end structure.

With reference to FIG. 11, each bracket 18 has two legs 22. Both legs 22 extend from the front-end support 14 toward the grille 16, as shown in FIGS. 3-4. In other words, each leg 22 is attached to the front-end support 14 and extends in the vehicle-forward direction F toward the grille 16. As one example, as shown in the Figures, each bracket 18 may be spaced from the grille 16, e.g., by the bars 24. As another example, each leg 22 may extend to the grille 16, i.e., be in contact with the grille 16.

Both legs 22 of both brackets 18 may be attached to the front-end support 14. One or both of the legs 22 may include an attaching feature 92 for each bracket 18 to the front-end support 14. The attaching feature 92 may be, for example, a hole, as shown in FIG. 9, for receiving a bolt or other fastener that engages the bracket to the front-end support 14. Alternatively, the attaching feature 92 maybe any suitable feature for attaching each of the brackets 18 to the front-end support 14.

With reference to FIGS. 7-9, each bracket 18 may present a surface 94 fixed to the bars 24. The surface 94 of each bracket 18 may be elongated and abut the bars 24, as shown in the Figures. Each bracket 18 may be of any suitable material. For example, each bracket 18 may be of steel, aluminum, etc.

With reference to FIGS. 7-9 and 11, the grille reinforcement 26 includes the two bars 24. The grille reinforcement 26 may include additional bars (not shown) in addition to the two bars 24 and which have the same structure and perform the same function as the bars 24 shown in the Figures. As an example, the bars 24 may be aligned with each other along the vehicle longitudinal axis L, as shown in FIG. 11. As another example, the bars 24 may be offset from each other along the vehicle longitudinal axis L. The two bars 24 are spaced from each other. The spacing between the two bars 24 and the spacing of the bars 24 may be designed based on the vehicle ride-height to align with the desired part of the leg form.

With reference to FIGS. 7-10, the bars 24 are elongated along the cross-vehicle axis A from one of the brackets 18 to the other of the brackets 18. In other words, the bars 24 are elongated from the left side 32 of the front-end structure 10 to the right side 34 of the front-end structure 10. In one example, the bars 24 may terminate at the brackets 18, as shown in FIGS. 12-15. In another example and as shown in FIGS. 7-10, the bars 24 extend outboard beyond the brackets 18. With reference to the Figures, the bars 24 may be parallel to each other.

The two bars 24 may be attached to both of the brackets 18. The bars 24 may be fixed to the brackets 18, i.e., the surfaces 94, in any suitable way including fasteners, welding, etc.

With reference to the Figures, the bars 24 may vary in size and in material. The bars 24 may be of any suitable material including steel, aluminum. The bars 24 may, for example, be hollow. As another example, the bars 24 may have a reinforcement inside the bars 24. As another example, the bars 24 may be solid (not shown). The bars 24 may be different from each other in shape.

The grille reinforcement 26 is fixed relative to the grille 16, i.e., the grille reinforcement 26 and the grille 16 move together as a unit. Specifically, the bars 24 may be fixed relative to the grille 16. The grille 16 may include cavities 84 for receiving the bars 24. In other words, the cavities 84 are sized to receive the bars 24. In one embodiment, the grille 16 is overmolded to the grille reinforcement 26, as shown in FIG. 1-11. In another embodiment, the grille reinforcement 26 is fixed to the grille 16, as shown in FIGS. 12-15. Common numerals are used to identify common features in the two embodiments.

In the embodiment shown in FIGS. 1-11, the grille 16 may be overmolded to the bars 24. In other words, the grille 16 may be a single, uniform piece of material with no seams, joints and may be fixed to the bars 24 without fasteners or adhesives holding the grille 16 and the bars 24 together. In such an example, the process of overmolding, as is known, forms the finished product of the grille 16 overmolded to the bars 24.

Figure 6:
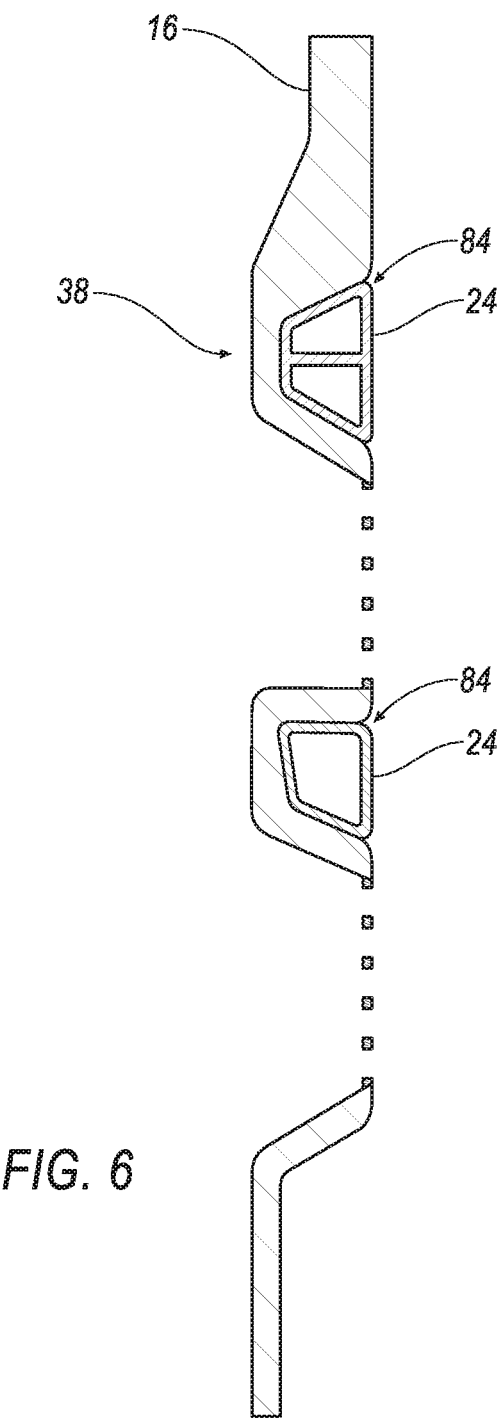
FIG. 6 a cross-section of the grille and the grille reinforcement.

In this embodiment, the bars 24 have an enclosed shape. In other words, the bars 24 have an enclosed cross-sectional shape normal to the cross-vehicle axis A, e.g., rectangle, square, polygon, circle, etc., as shown in FIG. 6.

In this embodiment, the grille reinforcement 26, e.g., the bars 24, reinforces the grille 16 during a pedestrian impact test. In other words, the grille reinforcement 26 redistributes forces from the pedestrian impact test from the grille 16 to the vehicle frame 28.

Figure 13:
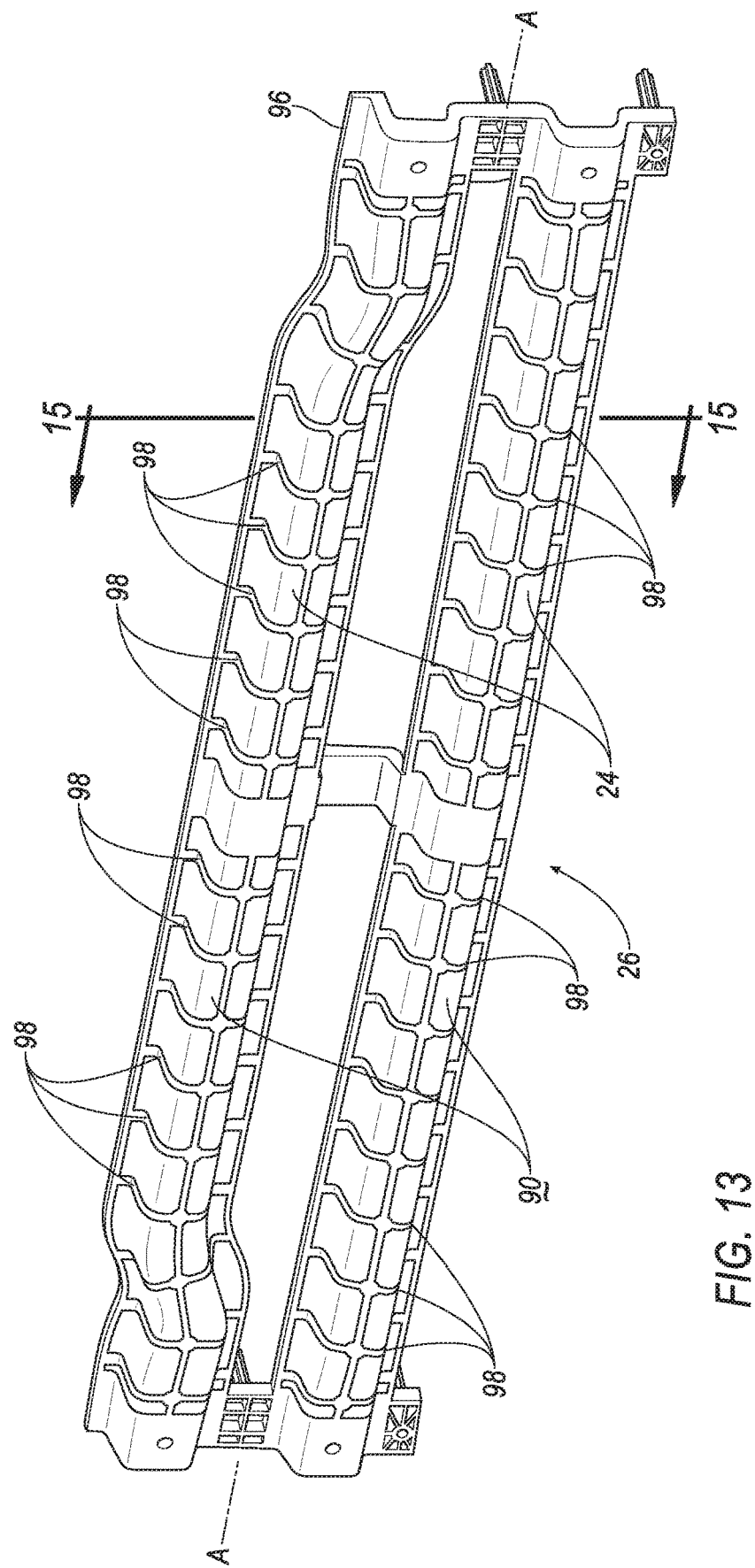
FIG. 13 is a perspective view of the embodiment of the grille reinforcement of FIG. 12.
Figure 14:
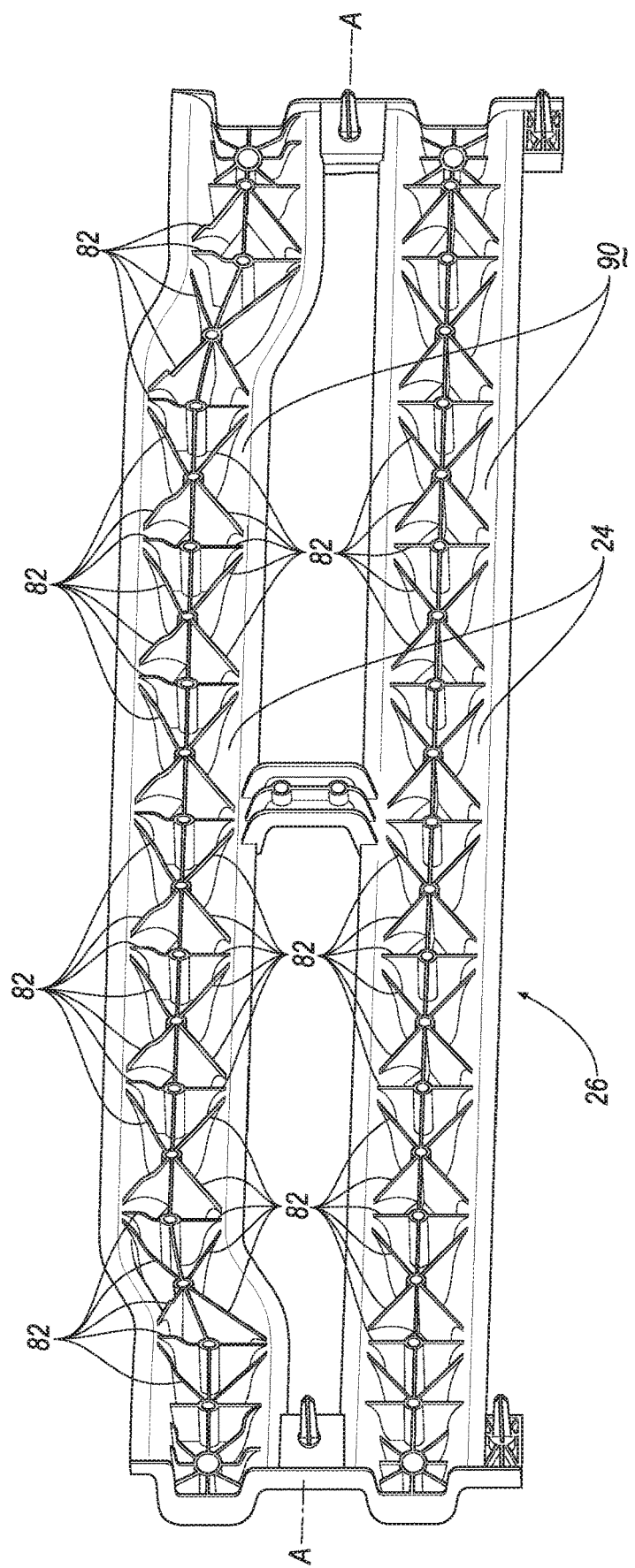
FIG. 14 is a rear view of the grille reinforcement of FIG. 13.
Figure 15:
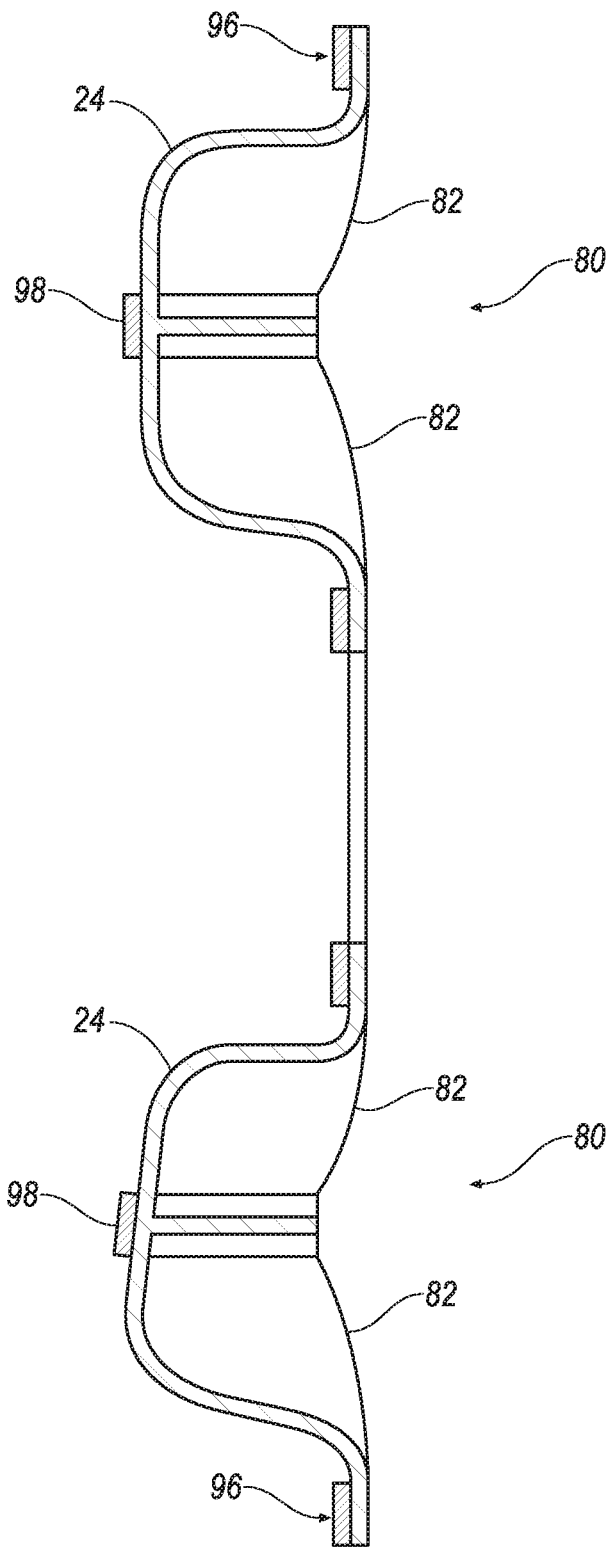
FIG. 15 is a cross sectional view along line 15 of the grille reinforcement of FIG. 13.

In the embodiment shown in FIGS. 12-15, the bars 24 may be fixed to the grille 16. For example, the bars 24 may be fixed to the cavities 84 in any suitable manner, e.g., adhesive, fasteners, etc. The bars 24 have an open shape, e.g., a "C" shape. In other words, the bars 24 have an open cross-sectional shape normal to the cross-vehicle axis A, as shown in FIG. 15. Said differently, the bars 24 may define an opening 80, as shown in FIG. 15. The opening 80 of the bars 24 may, for example, face the front-end support 14. In other words, the opening 80 may be in the vehicle rearward direction R of the vehicle-forward face 90 of the bars 24.

In this embodiment, the grille reinforcement 26 may include a support 96 overmolded to the bars 24. Overmolded" is a structural description of the material of the support 96 relative to the bars 24, not the process by which the support 96 is made, When overmolded, the support 96 may be a single, uniform piece of material with no seams, joints, and may be fixed to the bars 24 without fasteners or adhesives holding the support 96 and the bars 24 together. In such an example, the support 96 has a shape that conforms to a mold, e.g., an injection mold, used to form the support 96 as an overmolded component to the bars 24.

In this embodiment, the support 96 may include a plurality of ribs 82 disposed in the opening 80, as shown in FIG. 14. The ribs 82 may extend from the bars 24 along the longitudinal axis L, i.e., towards the front-end support 14. The ribs 82 may be spaced from each other along the cross-vehicle axis A, i.e., from the left side 32 to the right side 34.

Additionally, the support 96 may include strips 98 extending around the bars 24 to the opening 80. In other words, the bars 24 are disposed between the strips 98 and the ribs 82, as shown in FIG. 14. The strips 98 may be spaced from each other along the cross-vehicle axis A, as shown in FIG. 13. The strips 98 may have a same or different spacing as the ribs 82, i.e., the strips 98 may be aligned with the ribs 82 or disposed between the ribs 82. In this embodiment, the grille reinforcement 26 reinforces the grille 16 during the pedestrian impact test, as set forth above, and reduces the weight of the grille reinforcement 26 as compared to the embodiment in FIGS. 1-11.

In the embodiment shown in FIGS. 12-15, the active grille shutter 52 may, for example, be overmolded to the brackets 18. "Overmolded" is a structural description of the material of the active grille shutter 52 relative to the brackets 18, not the process by which the active grille shutter 52 is made. When overmolded, the active grille shutter 52 may be a single, uniform piece of material with no seams, joints, and may be fixed to the brackets 18 without fasteners or adhesives holding the active grille shutter 52 and the brackets 18 together. In such an example, the active grille shutter 52 has a shape that conforms to a mold, e.g., an injection mold, used to form the active grille shutter 52 as an overmolded component to the brackets 18. In this situation, the active grille shutter 52 may be disposed between and abut each of the brackets 18 and the front-end support 14. The surfaces 94 of the brackets 18 may, for example, be exposed after the active grille shutter 52 is overmolded to the brackets 18. In this situation, the bars 24 may be fixed to the surfaces 94 of the brackets 18. Alternatively, the brackets 18 may be formed separately from the active grille shutter 52 and subsequently fixed to the active grille shutter 52 and/or the front-end support 14. The brackets 18 may be fixed to the front-end support 14, as set forth above.

With reference to FIG. 4, the grille reinforcement 26, i.e., both bars 24 and both brackets 18, is rigid relative to the leg form of a pedestrian impact test. In other words, during the pedestrian protection impact test, the bars 24 and the brackets 18 experience minimal deformation upon impact with the leg form.

As an example, the leg form may be a lower leg form impactor. One such example, may be a flexible pedestrian leg impactor (Flex-PLI) leg form. Example regulations that can use the leg form include Global Technical Regulation (GTR), ECE R127, and Korean Motor Vehicle Safety Standards (KMVSS). Example new car assessment programs that can use the leg form include EuroNCAP, CNCAP, and ANCAP.

In operation during a pedestrian protection test, the bumper 86 and the grille 16 contact the leg form substantially simultaneously. The grille reinforcement 26 reinforces the grille 16. In other words, the bars 24 remain substantially undeformed during impact with the leg form. The bumper 86 and the bars 24 impact the leg form above and below the knee, as shown in FIG. 4, to distribute the loading on the leg form and reduce relative movement between the femur and the tibia.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A front-end structure comprising:
a front-end support;
a grille fixed relative to the front-end support;
two brackets disposed between the front-end support and the grille and spaced from each other along a cross-vehicle axis, the two brackets each having two legs extending from the front-end support toward the grille; and
two bars spaced from each other and the front-end support, the bars elongated along the cross-vehicle axis from one bracket to the other bracket.

2. The front-end structure of claim 1, further comprising a vehicle frame supporting the front-end support.

3. The front-end structure of claim 1, wherein the grille is supported by the front-end support.

4. The front-end structure of claim 1, wherein the bars are spaced from the front-end support in a vehicle-longitudinal axis perpendicular to the cross-vehicle axis, and further comprising a bumper below the bars and substantially aligned with the bars along the vehicle-longitudinal axis.

5. The front-end structure of claim 4, further comprising a vehicle frame, and the bumper is attached to the vehicle frame.

6. The front-end structure of claim 1, further comprising a radiator, the front-end support being between the radiator and the grille.

7. The front-end structure of claim 6, further comprising an active grille shutter between the radiator and the grille.

8. The front-end structure of claim 1, wherein both legs of both brackets are attached to the front-end support.

9. The front-end structure of claim 1, wherein both of the bars are attached to both of the brackets.

10. The front-end structure of claim 1, wherein the grille includes cavities receiving the bars.

11. The front-end structure of claim 1, wherein the grille is overmolded to the bars.

12. The front-end structure of claim 1, further comprising a grille reinforcement including the two bars and a support overmolded to the bars.

13. The front-end structure of claim 12, wherein the bars have an open shape in cross section normal to the cross-vehicle axis.

14. The front-end structure of claim 13, wherein the support includes ribs disposed in the opening of the bars, the ribs spaced along the cross-vehicle axis.

15. The front-end structure of claim 12, further comprising an active grille shutter between a radiator and the grille, wherein the grille reinforcement and the brackets are overmolded with the active grille shutter.

16. The front-end structure of claim 1, wherein both bars and both brackets are rigid relative to a leg form during a pedestrian protection impact test.

17. The front-end structure of claim 1, wherein the two bars are parallel to each other.

18. The front-end structure of claim 1, further comprising a vehicle frame and a vehicle body, the vehicle body including two rails each including an upper portion elongated along a vehicle-longitudinal axis and each including a lower portion extending from the upper portion to the vehicle frame, the front-end support being attached to the lower portions.

19. The front-end structure of claim 18, wherein the front-end support includes a lower portion abutting the lower portions of the two rails and includes arms abutting the upper portions and elongated along the vehicle-longitudinal axis.

20. The front-end structure of claim 19, wherein the lower portion of the front-end support is attached to the vehicle frame.

* * * * *